US007832785B2

United States Patent
Queveau et al.

(10) Patent No.: US 7,832,785 B2
(45) Date of Patent: Nov. 16, 2010

(54) VEHICLE WITH INTEGRATED SLIDING ROOF MODULE

(75) Inventors: Gerard Queveau, Le Pin (FR); Paul Queveau, Montravers (FR); Jean-Marc Guillez, Cirieres (FR)

(73) Assignee: Societe Europeenne de Brevet Automobiles, Paris (FR)

( * ) Notice: Subject to any disclaimer, the term of this patent is extended or adjusted under 35 U.S.C. 154(b) by 1122 days.

(21) Appl. No.: 10/563,997

(22) PCT Filed: Jul. 16, 2004

(86) PCT No.: PCT/FR2004/001881

§ 371 (c)(1),
(2), (4) Date: May 31, 2006

(87) PCT Pub. No.: WO2005/007433

PCT Pub. Date: Jan. 27, 2005

(65) Prior Publication Data

US 2006/0267371 A1 Nov. 30, 2006

(30) Foreign Application Priority Data

Jul. 16, 2003 (FR) .................................. 03 08695
Aug. 4, 2003 (FR) .................................. 03 09605

(51) Int. Cl.
*B60J 7/00* (2006.01)
(52) U.S. Cl. ............................. 296/107.18; 296/107.08; 296/107.16
(58) Field of Classification Search ............ 296/107.01, 296/121, 123, 107.8, 107.16–107.2, 216.04, 296/193.12, 64, 65.01, 65.16
See application file for complete search history.

(56) References Cited

U.S. PATENT DOCUMENTS

| 6,217,104 | B1 * | 4/2001 | Neubrand .................... 296/108 |
| 6,443,517 | B1 * | 9/2002 | Just et al. ............... 296/107.09 |
| 6,676,192 | B2 * | 1/2004 | Marold et al. .......... 296/107.19 |
| 6,814,391 | B2 * | 11/2004 | Biecker et al. .............. 296/108 |
| 7,036,866 | B2 * | 5/2006 | Perakis ..................... 296/107.2 |
| 7,134,708 | B2 * | 11/2006 | Russke ....................... 296/108 |

(Continued)

FOREIGN PATENT DOCUMENTS

DE          3816060          11/1989

(Continued)

*Primary Examiner*—Glenn Dayoan
*Assistant Examiner*—Gregory Blankenship
(74) *Attorney, Agent, or Firm*—Richard Gilly; Joseph P. Quinn; Seyfarth Shaw LLP

(57) ABSTRACT

The invention concerns a vehicle comprising a body roof having an opening capable of being closed and a folding top consisting of several rigid parts (3), (4), (5) and a modular roof assembly (1) mounted directly in one single piece on the vehicle structure, said assembly comprising the folding top, with its mobile parts (3), (4), (5), a frame (10) supporting the folding top, adapted to be positioned opposite marking elements (75) of the vehicle structure and connected thereto, the parts of the roof being mobile between an extended position, resulting from a forward displacement, and a folded position wherein said parts are substantially vertically retracted behind the seats (7), side by side, a mechanism (40, 50) for displacing the roof parts, borne by the support frame, being also provided, after the modular roof assembly has been positioned inside the vehicle, for displacing said roof parts relative to the roof opening between their extended and retracted positions.

15 Claims, 5 Drawing Sheets

U.S. PATENT DOCUMENTS

Figure 1:
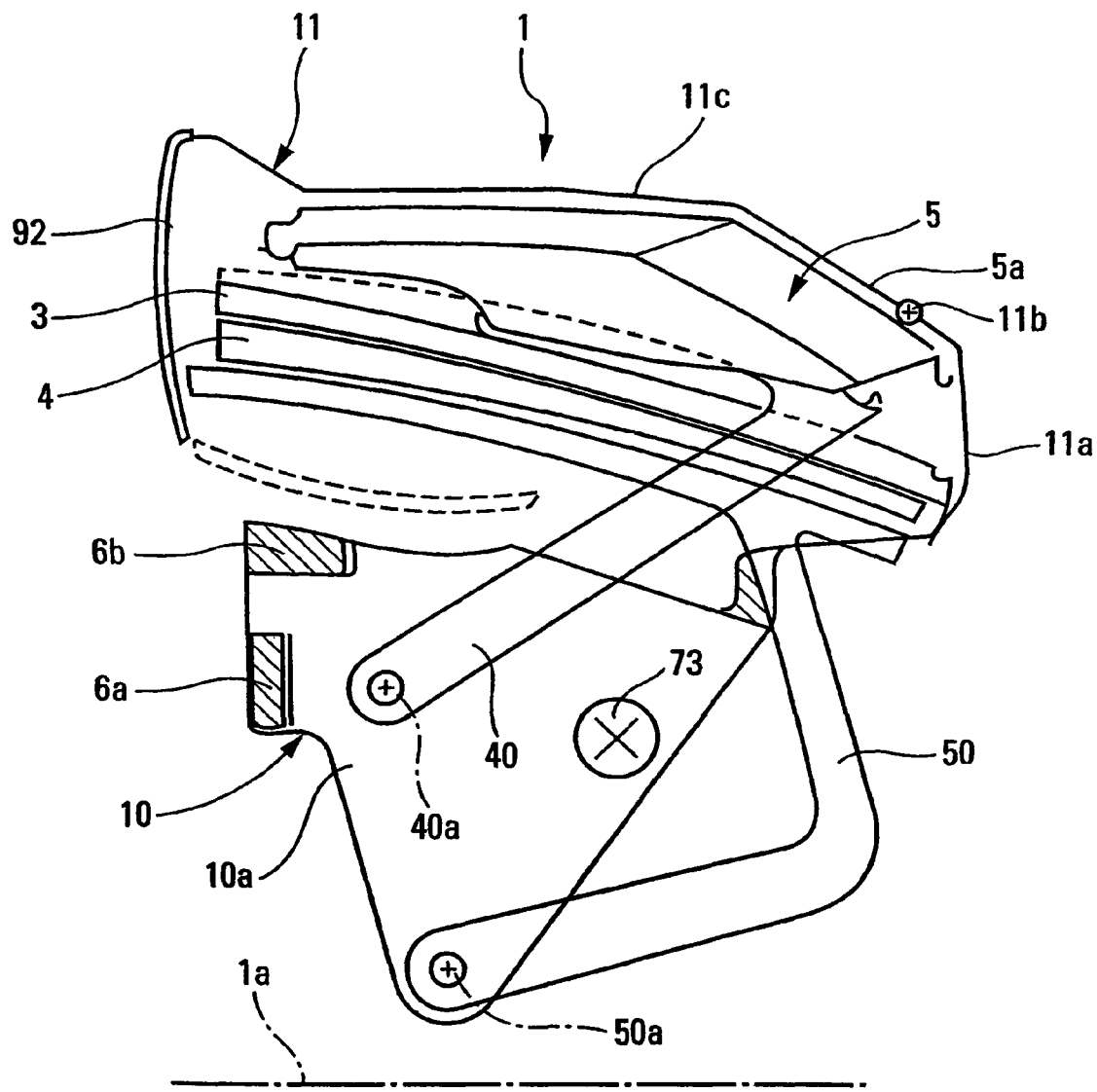

| | | | |
|---|---|---|---|
| 7,150,491 B2 * | 12/2006 | Perakis | 296/107.2 |
| 7,156,446 B2 * | 1/2007 | Perakis | 296/107.2 |
| 7,240,960 B2 * | 7/2007 | Fallis et al. | 296/218 |
| 7,320,499 B2 * | 1/2008 | MacNee et al. | 296/219 |
| 7,374,235 B2 * | 5/2008 | Queveau et al. | 296/220.01 |
| 7,377,575 B2 * | 5/2008 | Queveau et al. | 296/107.18 |
| 2001/0045759 A1 | 11/2001 | Russké | |
| 2003/0020299 A1 | 1/2003 | Bauer et al. | |

FOREIGN PATENT DOCUMENTS

| | | |
|---|---|---|
| DE | 20204110 | 9/2002 |
| DE | 10159390 | 11/2002 |
| EP | 1228913 | 8/2002 |
| EP | 1331120 | 7/2003 |
| WO | WO 03/084773 | 10/2003 |

* cited by examiner

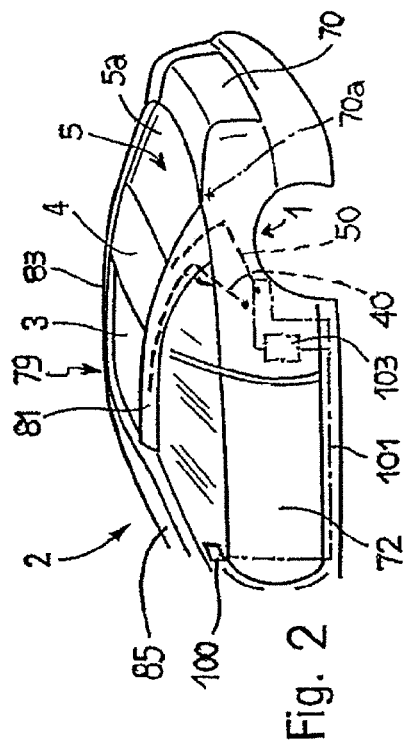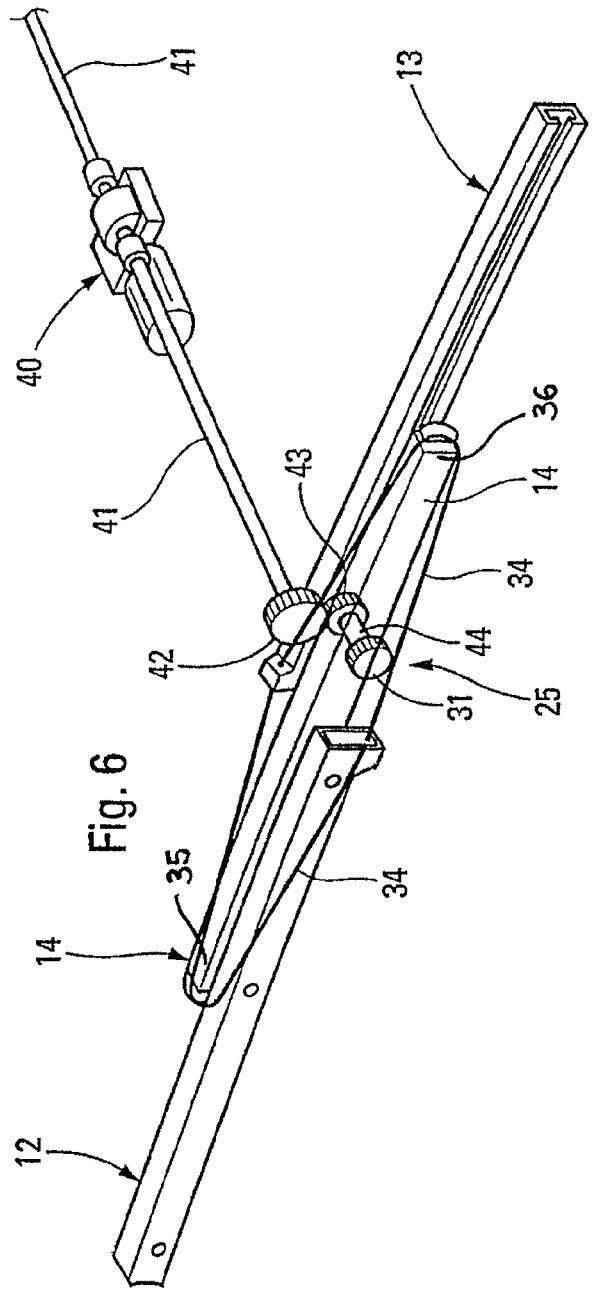

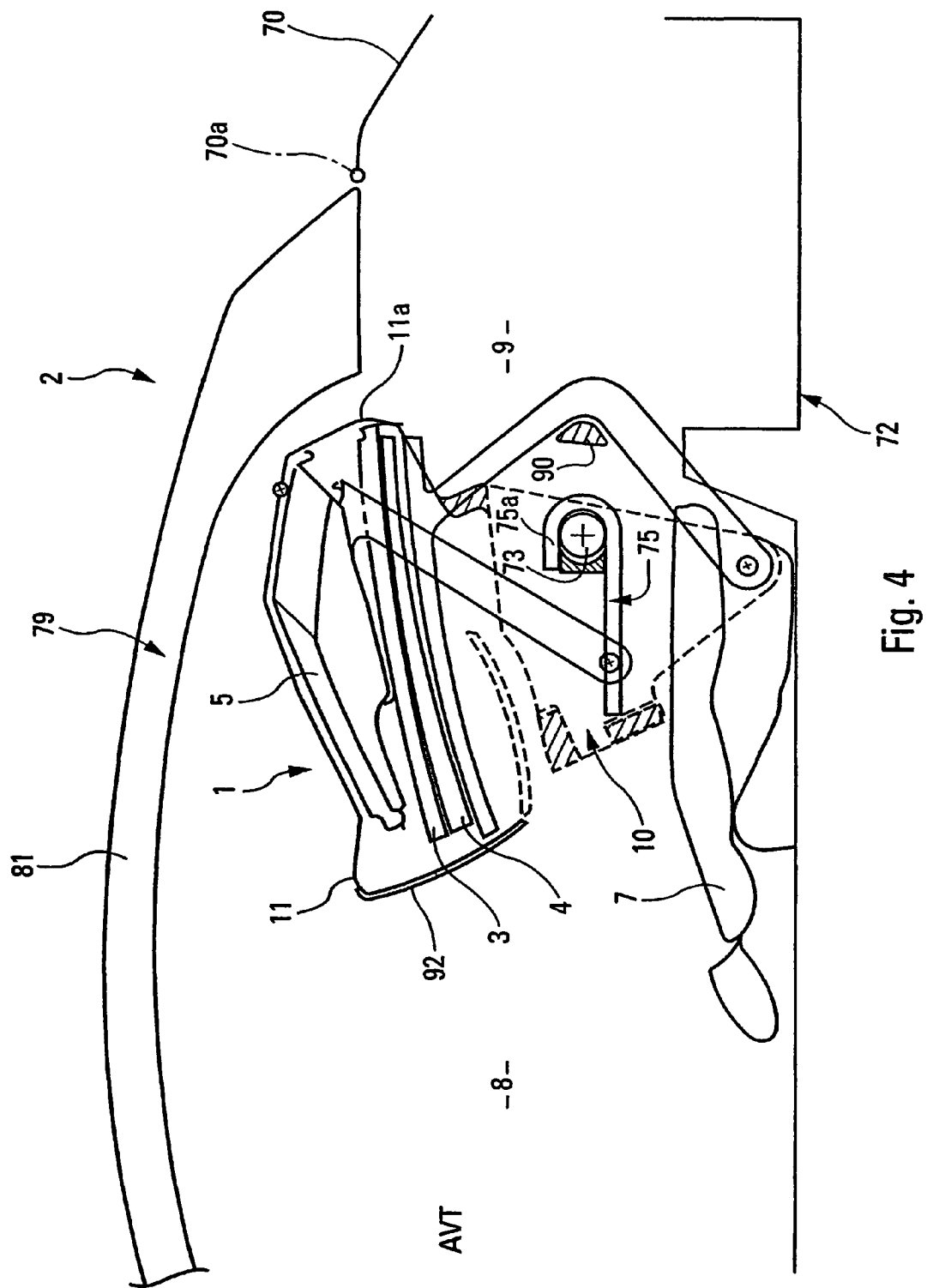

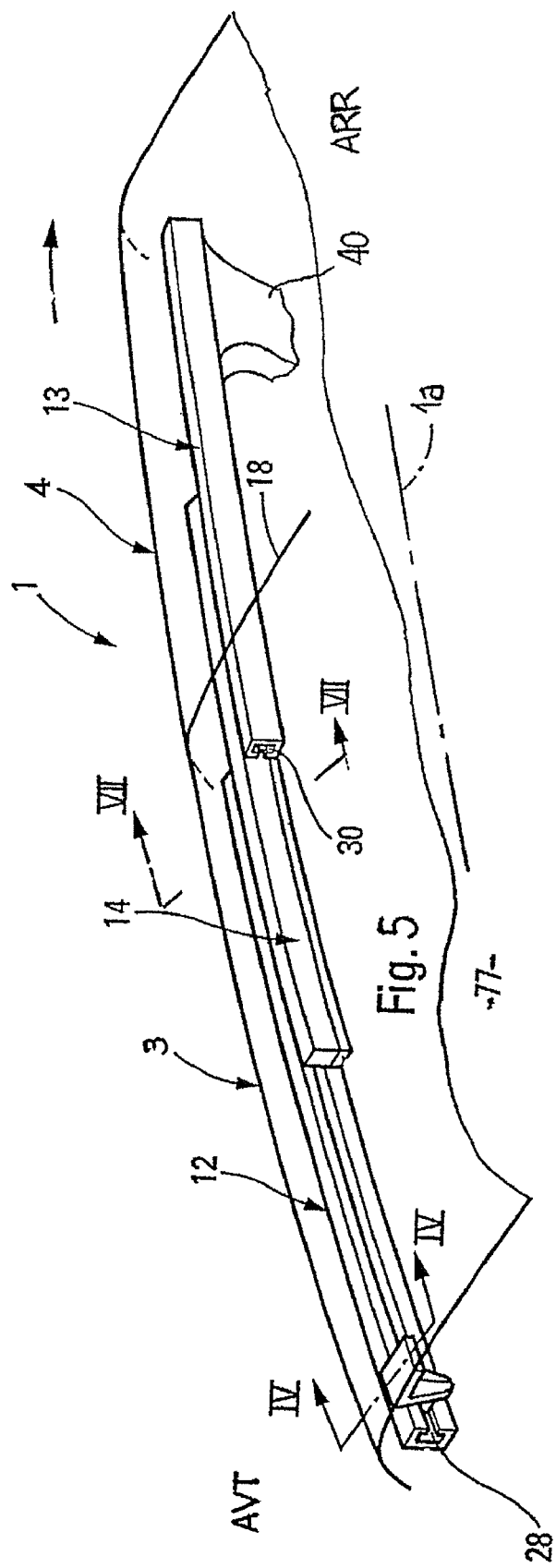
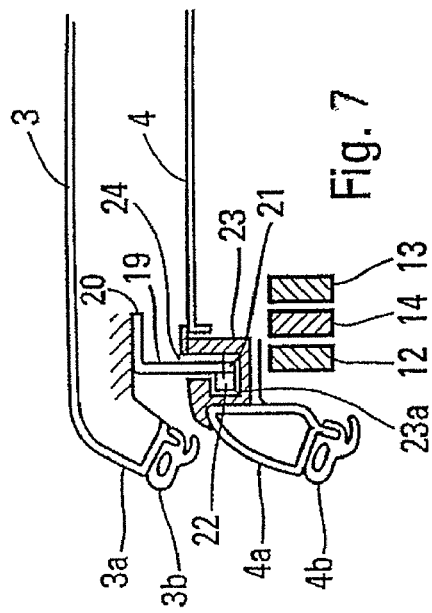

VEHICLE WITH INTEGRATED SLIDING ROOF MODULE

This invention relates to a vehicle retractable roof, and more particularly such a roof that comprises several rigid roof elements (or parts) that can be moved between a position in which they cover the vehicle passenger compartment and a position in which they are stored in the trunk at the back of the vehicle.

Such retractable roofs are known capable of transforming a two-door or four-door sedan type vehicle into a convertible type vehicle.

Thus, vehicles comprising the following are already known:
- a passenger compartment with seats located at the back of the passenger compartment,
- a vehicle structure locally defining a roof panel with a closeable opening and a retractable roof, this roof comprising at least two rigid parts free to move with respect to said structure, namely a first front part and a second rear part, the opening being adapted to house said roof parts after sliding, these roof parts being free to move between an extended position into which they move after their forwards movement, and in which these parts cover the passenger compartment and are substantially in line one behind the others, and a folded position into which they move after their backwards movement and in which the parts are offset from each other and retracted into a storage space located behind the seats, these roof parts in some cases can then occupy a substantially vertical position adjacent to each other,
- and a roof parts movement mechanism.

FR-B-2 694 245 contains a description of such a retractable roof system.

One problem encountered with retractable roofs that retract into a storage space inside the bodywork relates to their placement in this vehicle. Automobile manufacturers and their subcontractors are thus confronted in particular with difficulties with management and ergonomics of assembly lines, procurement of parts, difficult assembly and long assembly times.

One purpose of the invention is to provide a solution to this problem.

Thus, the invention discloses that:
- the vehicle structure comprises housing and locking guiding elements, in addition to the above,
- the retractable roof and its moving parts are integrated into an add-on modular roof assembly added as a single part onto the vehicle structure, this assembly comprising:
- in addition to the roof and its movement mechanism,
- a retractable roof support body adapted so that it can be positioned facing guiding elements of the vehicle structure, and connected to it,
- the roof parts movement mechanism being connected to the roof parts and supported by the support body so that once the modular roof assembly is positioned inside the vehicle, said roof parts are moved with respect to the roof opening and to the vehicle structure, between the extended and folded positions.

Preferably, such a vehicle according to the invention will be such that two cradles aligned perpendicular to the longitudinal axis of the vehicle are fixed either to the vehicle structure or to the support body of the modular roof assembly, and two trunnions adapted to fit into the cradles are fitted to the other (support body or vehicle structure), to enable pivoting of said modular roof assembly with respect to the vehicle structure when the roof parts are in the folded positions.

Thus, in addition to the assembly and line management advantages mentioned above, it is possible to save storage/loading volume in the back volume (trunk) of the vehicle.

Furthermore, the following recommendations are also made in this respect:
- the vehicle seats should be installed on the structure so that they can be tilted forwards, and
- the vehicle should further include means of actuating the modular roof assembly, these actuation means comprising a control accessible to the vehicle user to tilt the modular roof assembly between the folded position of the roof parts when they are arranged adjacent to each other, preferably substantially vertically behind the seats, and a position tilted forwards in the passenger compartment when the seats themselves are tilted forwards.

Also, in an attempt to increase the storage volume and to make the roof module more compact (to facilitate assembly or even subsequent work on it) it is advantageously planned that:
- the support body and the movement mechanism for the roof parts define two side blocks and thus extend essentially laterally and in the immediate vicinity of roof parts in the folded position to clear an available space between said side blocks,
- the roof storage area communicates with the vehicle trunk,
- and the vehicle further comprises stop means to stop the modular roof assembly in a substantially horizontal position of the roof parts, thus superposed with respect to each other, these roof parts then clearing an additional available storage space underneath.

The central roof elements are thus separated from the side roof elements that remain attached to and fixed to the chassis. In one particular embodiment, the front central roof element is installed on a slide fitted in a second slide, itself engaged in a third slide supported on the intermediate roof element.

Figure 3:
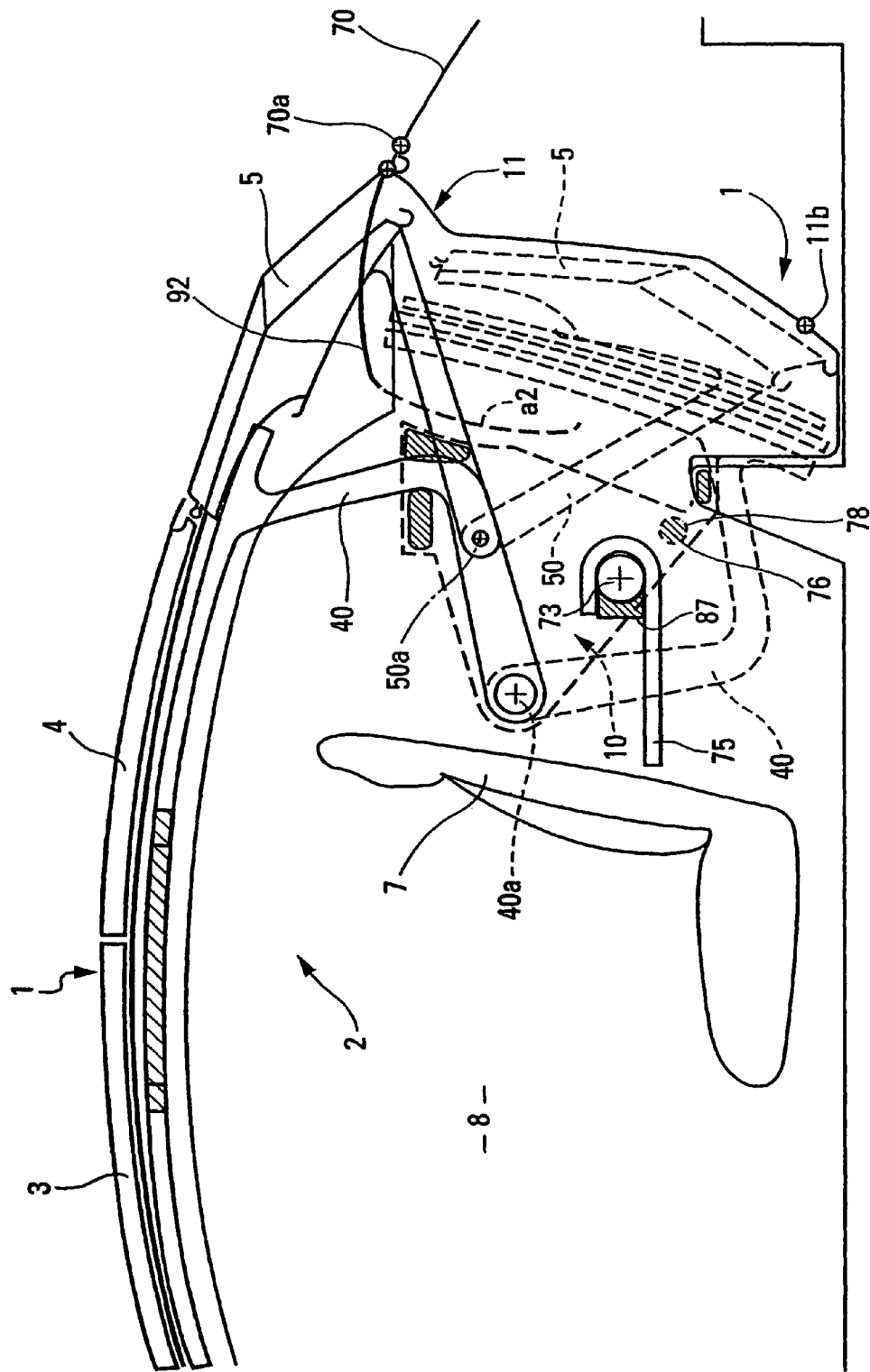

We will now describe one particular embodiment of the invention as a non-limitative example with reference to the diagrammatic drawings in which:

FIG. 1 shows the roof module folded ready to be installed in a vehicle, as shown in FIG. 2 at a smaller scale, FIGS. 3 and 4 show the retractable roof in different positions, FIG. 4 showing the roof module folded, tilted forwards to release an additional storage volume in the trunk, FIG. 5 shows a partial perspective view (with a cross-sectional view) of the two roof panels described herein in the closed position, FIG. 6 shows one possible control of roof panel slides, and FIG. 7 shows cross-section VII-VII in FIG. 5.

FIG. 1 shows a roof module 1 in the folded position. As represented, this module includes a support body 10 provided with two parallel plates (or lateral blocks), only one of which (mark 10a) is shown, connected to each other by beams such as 6a, 6b transverse to the longitudinal axis 1a of the vehicle. A first arm 40 is fitted on these plates and is articulated free to rotate about an axis 40a transverse to the longitudinal axis 1a of the vehicle, this arm supporting and articulating the central roof elements 3, 4. A second arm 50 is also articulated on these plates about a second axis 50a transverse to the longitudinal axis of the vehicle. This second arm supports and articulates the rear roof element 5.

Thus, as shown in particular in FIGS. 2 and 3, the roof module 1 in this case comprises two rigid and substantially flat panels 3, 4 (generally installed free to slide with respect to each other, substantially along 1a by sliding means), and a rear roof element 5 containing the rear window 5a of the vehicle.

All of these roof elements can be retracted behind the rear seats 7 at the back of the passenger compartment 8, in a storage space 9 communicating with the trunk lid 70 of the vehicle, regardless of whether or not this trunk is projecting (as in FIG. 2). The trunk lid 70 may tilt only forwards (in 70a) on the vehicle structure 72, so that it can only tilt in the forward direction when it opens.

The elements 3, 4, 5 are stored in the space 9 inside a storage compartment or casing 11 fixed to the body 10 (particularly the two plates 2).

Two trunnions extend in the transverse direction of the vehicle on each plate, one, of which (73) is shown in FIGS. 1, 3 and 4.

Such a roof assembly with its roof elements, its body 10, its articulations and its storage casing 11 forms a roof module that can be installed directly in a vehicle that has previously been prepared to contain such a module in a single piece.

To achieve this, the two cradles 75 are fixed to either the vehicle structure 72 or the support body 10 (only one cradle being shown, in FIGS. 1, 3, 4), aligned perpendicular to the longitudinal axis of the vehicle, and the two trunnions 73 adapted to fit into the cradles are fitted to the other (either the support body 10 or the vehicle structure 72), to enable the modular roof assembly 1 to pivot with respect to the vehicle structure when the roof parts are in the folded position (FIGS. 1, 3, 4).

Other guiding housing and locking elements such as mobile lateral pins controlled to engage in or to move out of the cooperating orifices 78 are provided, partly on the structure 72 and partly on the body 10 (side uprights 10a) (FIG. 3).

This module is positioned in the vehicle by inserting it through the back or the top of the vehicle, thus through the central longitudinal opening 77 that is located in the roof 79 to house the roof elements 3, 4, 5 between the two bars or lateral members 81, 83. As can be seen in FIGS. 2, 4 and 5, these roof members are fixed with respect to the structure 72 and in this case extend between the windshield 85 and the side edges of the trunk lid 70.

The vehicle trim (seats, dashboard, etc.) is put into place later.

Once the roof has been installed, each trunnion 73 moves into position and is fixed in one of the cradles 75 in which it is locked by a shim 87 with freedom of rotation. The cradles 75 may have a "U" section open forwards and with an upper branch 75a shorter than the lower branch, which facilitates assembly.

One fixed, the module is tilted until it is substantially vertical (FIG. 3 in dashed lines). In this position, the movement of the roof elements may be controlled between their closed/extended position (above the passenger compartment, FIGS. 3 and 5) and their stored position (FIG. 3 in dashed lines and FIG. 4).

Another advantage of the invention is in the forward tilting of the module 1 in the passenger compartment 8 when the roof elements are stored in their substantially vertical position, as shown in the comparison between FIGS. 3 and 4. Thus, the module could be arranged to pivot from its substantially vertical folded state into a state in which it is also folded but is substantially horizontal, through the two trunnions that pivot about the chassis 72.

Now considering the connection and the relative movement between the rigid panels 3 and 4 (if two such panels are provided), note that in particular it would be possible (see FIG. 5) for the front roof element 3 to be installed on a first slide 12. This first slide is installed free to slide on a second slide 14 itself sliding on a third slide 13 that is fixed to panel 4 (unless relative freedom of movement is allowed between the rear panel 4/slide 13 so that the front panel 3 can fit under the rear panel 4 in the open/superposed position of the panels, and therefore conversely to the order of stacking in FIGS. 1 and 4. This third slide 13 is articulated to the chassis (more precisely to the body 10 of the module 1 fixed to the structure 72) through the articulation arm 40 that prolongs it (see FIG. 5) and that drives the two superposed roof elements 3, 4 to their stored position in the space 9, and more precisely in the storage casing 11.

The sliding means substantially along line 1a between the panels 3, 4 may be of a known type, for example as described in FR-A-2 797 226 (in particular see page 5 line 10-page 6, line 23).

As shown once again in FIGS. 5, 6 and 7, these sliding means may be arranged such that the front panel 3 is free to move between a closed position diagrammatically shown in FIGS. 3 and 5 in which it covers the passenger compartment 79, and an open position in which, after sliding backwards, it is superposed on the central panel 4 as shown diagrammatically in FIG. 7 and FIG. 3 in dashed lines.

As shown in FIG. 7, the upper end 20 of a tab 19 supporting a spindle 22 at its lower end 21 fitting into a groove 23a of a guide slide 23 supported by the central panel 4 and open at the top along a groove 24 to allow the passage of the tab 19, is fixed to the rear end 18 of the front panel 3. The slide 23 is fixed to the panel 4.

Drive means 25 are provided so that firstly the front slide 12 slides with respect to the intermediate slide 14, and secondly the intermediate slide 14 slides with respect to the rear slide 13 preferably at the same time and at the same relative velocity.

Obviously, everything described for the right side of the vehicle is equally applicable for the left side, due to symmetry.

The front slides 12, 13, 14 extend together between the front and back of the panels 3, 4 (FIG. 5). In this example, the intermediate slide 14 supports two rollers 27 on the outside located in its front half and capable of running in a groove 28 of the front slide 12.

Similarly, the intermediate slide 14 carries two rollers 29 in its rear half on the inside of the vehicle, capable of rolling in a groove 30 in the rear slide 13.

Each panel 3, 4 includes lateral reinforcements 3a, 4a and the corresponding seals 3b, 4b sliding in close contact along the lateral roof members 81, 83.

The three slides 12 to 14 are located on the inside of the corresponding lateral reinforcement 4a, substantially under the corresponding guide slide 23.

In the embodiment shown diagrammatically in FIG. 6, the drive means 25 include a driving gear 31 driving a rack 32 supported on the slide 14.

Also preferably, the drive means 25 include an endless cable 34 supported by the intermediate slide 14 and winding between two pads 35, 36 fixed to the two longitudinal ends of the intermediate slide 14, two points of which are fixed, the first point being fixed to the front of the central panel 4, and the other being fixed to the rear end 18 of the front panel 3.

In the example, a motor 40 drives two half shafts 41 each carrying a first gear 42 engaged to a second gear 43 fixed on a spindle 44 driving the driving gear 31 engaged with the rack 32.

When the motor 40 rotates in the direction to open the roof from its closed position in FIG. 5, the gear 31 moves the rack 32 and the slide 14 backwards (ARR). The cable 34 turns around the pads 35, 36 and entrains the front panel 3 backwards.

The slides 12, 13, 14 have a circular profile with the same radius.

Refer to p 8 line 31 to p 10 line 13 in FR-A-2 797 226 for information about how the central panel 4 is locked to the structure 72 of the vehicle 2.

The front end of the guide slide 23 includes a curved part extending upwards and towards the back of the vehicle, concave downwards, to raise the back 18 of the front panel 3 above the front end 38 of the central panel 4 as soon as sliding towards the back of the front panel 3 starts.

Refer to p 10 line 22 to p 12 line 17, for details about this aspect.

Once the roof panels 3, 4 are in the open position, superposed and substantially horizontal as shown in FIG. 7 in the roof-raised position, the roof can be stored in the space 9 if it is required to do so.

To achieve this, the user will deliberately trigger a control that will firstly make the rear roof element 5 tilt slightly backwards, raising its front edge so that the superposed roof panels 3, 4 can pass underneath.

These roof panels will then tilt around the pin 40a driven by the two lateral arms 40, therefore each connected fixed to the rear slide 13.

Then, and a priori in a complementary movement, the rear roof element 5 will tilt completely backwards under the control of these lateral arms 50, that are also fixed to this roof element.

The assembly thus reaches its storage position in the space 9, with a substantially vertical arrangement of the elements 3, 4, 5 then arranged side by side as shown in dashed lines in FIG. 3.

It would also have been possible to enable relative articulation between the arms 40, 50 and the roof elements to which they are connected. But this is not essential in this configuration.

Since the storage area 9 communicates with the vehicle trunk that is closed off by the cover 70, a useful storage volume is maintained at the back.

As shown in FIGS. 3 and 4 for comparison, it is also possible in the invention for the roof module 1 to tilt from its folded substantially vertical position in FIG. 3 towards a position tilted forwards (AVT) as shown in FIG. 4 after the seats 7 have been tilted forwards.

In this case it is not the arms 40, 50 that pivot but the entire roof module 1, about the trunnions 73 to bring the module into the substantially horizontal position of its roof elements 3, 4 and 5 then being superposed.

Tilting of the module 1 is advantageously controlled from the vehicle dashboard with a control 100 (FIG. 2) which is connected through a wire 101 connected to the pins 76 to lock or unlock the module and control its tilting through a motor 103 or actuators if necessary.

Stop means that may consist of one or several stops 90 fixed to the structure 72 of the vehicle stop the modular assembly in this position tilted forwards, above the tilted seats 7, thus clearing an available additional storage space behind the module 1 and a priori between the casing 11 and these seats.

As it is obvious, the roof elements 3, 4, 5 are advantageously stored inside a housing casing 11 that will form a sort of cladding and protection box.

This casing 11 is connected and fixed to the body 10 of the module and may firstly include a bottom 11a fixed to the body.

Near the bottom (when the elements 3, 4 and 5 are in the substantially vertical stored position as shown in FIG. 3), the casing 11 may be provided with a transverse hinge pin 11b (see also FIG. 1) for pivoting of an upper flap 11c to access the inside of the casing.

The rear shelf 92 is substantially horizontal opposite the bottom 11a and above the roof elements 3, 4 and 5 stored vertically in their dashed position shown in FIG. 3.

The shelf 92 may be designed to pivot at the same time as the casing 11 when it passes into its position in FIG. 4, with the entire module.

The shelf 92 is also free to move with respect to the casing 11 (if it is connected to it) and also with respect to the structure 72 of the vehicle, to retract to the inclined position opening up a passage for the roof elements when they need to pass through the level of the shelf, to be folded or extended.

Thus in FIG. 3, the substantially vertical position of the shelf 92 tilted forwards is shown in dashed lines, showing the position occupied by the shelf in this example during roof movements.

In particular, when the shelf 92 is in the horizontal position, it can close the upper end of the casing 11.

In the above, the description relates to the case of a rear roof element 5 supporting a rear window 5a and installed free to move with respect to the vehicle structure.

However, the principle of the invention is applicable to other solution types such as a solution with a fixed rear element 5, or even front panels that cannot be retracted into the storage space and that would then simply be free to incline/slide at the top of the roof.

The invention claimed is:

1. A vehicle having a front part, a rear part and a longitudinal axis, and comprising:
    a passenger compartment provided with seats located at the rear of the passenger compartment;
    a vehicle structure with respect to which at least two rigid parts of a retractable roof are free to move, respectively a first, front part and a second, rear part, said rigid roof parts being free to move between an extended position reached at the end of a forwards movement, and in which said parts cover the passenger compartment and are substantially in line one behind the other, and a folded position reached at the end of a rearwards movement and in which said parts are offset from each other and retracted into a roof storage space located behind the seats; and
    an add-on modular roof assembly added as a single part onto the vehicle structure, said assembly comprising:
    the retractable roof and its rigid parts;
    a retractable roof support body connected to the vehicle structure; and
    a roof parts movement mechanism connected to said roof rigid parts and supported on the support body for moving the roof rigid parts with respect to the roof opening, between their extended and folded positions, once the modular roof assembly is positioned inside the vehicle, wherein the modular roof assembly is positioned inside the vehicle using guiding housing and locking elements provided partly on the vehicle structure and partly on the support frame such that the support frame is positioned facing the guiding housing elements of the vehicle structure, and the vehicle structure locally defines a roof opening closeable by means of the retractable roof, said vehicle structure being adapted to house a sealed sliding movement of the roof parts along two fixed, lateral members disposed on both lateral sides along the roof opening.

2. The vehicle according to claim 1 wherein the roof parts occupy a substantially vertical position, adjacent to each other, when in their folded position.

3. The vehicle according to claim 1, characterized in that one of the guiding housing and locking elements provided on the vehicle structure and the support body of the modular roof assembly comprises two cradles aligned perpendicular to the longitudinal axis of the vehicle, and the other of said guiding housing and locking elements and said support body comprises two trunnions adapted to fit into the cradles, to enable pivoting of said modular roof assembly with respect to the vehicle structure.

4. The vehicle according to claim 3 wherein: the seats of the vehicle are installed on the structure so that they can be tilted forwards, and the vehicle further includes actuation means actuating the modular roof assembly, said actuation means comprising a control to tilt the modular roof assembly between said folded position of the roof parts, when they are arranged adjacent to each other, substantially vertically behind the seats, and a position tilted forwards in the passenger compartment, when said seats are already tilted forwards.

5. The vehicle according to claim 1 wherein: the support body and the movement mechanism for the roof parts define two blocks located laterally on each side of the longitudinal axis of the vehicle to clear an available space between said blocks; the roof storage space communicates with a vehicle trunk in which luggage is loaded; and the vehicle further comprises stop means to stop the modular roof assembly in a substantially horizontal position of the roof parts, thus superposed with respect to each other, the roof parts then clearing an additional available storage space underneath.

6. The vehicle according to claim 1 wherein: the roof comprises three rigid parts among which a third rigid part is arranged in front of the first front part, in the extended position: the second roof rear part comprises a rear window, and the movement mechanism for these roof parts comprises pivoting arms which are, at one end, hinged with respect to the support body, at two different locations, and are connected, at another end, for one of said pivoting arms to the second roof rear part and, for the other, to the first roof front part, said other pivoting arm being connected to slides through a relative sliding movement between the first, front part and the third part of the roof, between the fixed lateral members.

7. The vehicle according to claim 1 wherein a housing casing is fixed to the modular roof assembly and houses said rigid roof parts when they reach their said folded position in which they are arranged substantially vertically.

8. The vehicle according to claim 7 wherein: the vehicle is provided with a rear shelf moving between a substantially horizontal position when said rigid roof parts are in their folded position, adjacent to each other, and a substantially vertical position, tilted forwards, during extension or folding of said roof rigid parts; said rear shelf substantially closes an upper part of the casing when it is in its substantially horizontal position and the roof parts are in the folded position inside said housing casing.

9. The vehicle according to claim 7 wherein at the rear of the vehicle, when the roof rigid parts are in the folded position, the housing casing comprises a movable panel installed free to pivot at a lower part about a fixed part connected and fixed to the support body of the modular roof assembly.

10. The vehicle according to claim 1, wherein each of said two fixed, lateral members are fixed onto the vehicle structure.

11. A method for fitting equipment on a vehicle the method comprising the following steps of: supplying a vehicle structure having a hack and a top, and comprising a passenger compartment, and, a trunk and a windshield frame, between which a roof opening located at the top of the passenger compartment and closeable by means of a retractable roof is defined, the vehicle structure being further provided with roof lateral members extending on both lateral sides of said roof opening, between said trunk and said windshield frame:

supplying a modular roof assembly; adapted to be added as a single part onto the vehicle structure, said assembly comprising:

the retractable roof which comprises at least a first, rigid roof part and a second, rigid roof part, said rigid roof parts being free to move between an extended position in which they cover the passenger compartment and a folded position in which they are retracted into a roof storage space delimited in the trunk; and a retractable roof support body adapted to be locked to the vehicle structure;

inserting the modular roof assembly inside the vehicle structure from at least one of rear and the top thereof, through said roof opening for the retractable roof;

positioning and locking said retractable roof support body facing guiding housing and locking elements provided on the vehicle structure;

then installing in the passenger compartment vehicle internal trim and seats.

12. The method according to claim 11, wherein, when the modular roof assembly is inserted inside the vehicle, the roof rigid parts are in their folded position.

13. The method according to claim 11, further comprising the step of adapting the vehicle structure to house a sliding movement of the roof rigid parts along said roof lateral members, between said extended position and folded position.

14. The method according to claim 11, further comprising the step of providing the vehicle with slides, so that the roof rigid parts can move along said slides, between said extended position and folded position.

15. The method according to claim 14, further comprising the step of attaching the slides to the retractable roof support body.

* * * * *